United States Patent
Marmor

(10) Patent No.: US 7,987,293 B2
(45) Date of Patent: Jul. 26, 2011

(54) DYNAMIC CONTENT CONVERSION

(75) Inventor: Eliyahu Marmor, Kfar-Saba (IL)

(73) Assignee: NetMask (El-Mar) Internet Technologies Ltd., Kfar-Saba (IL)

( * ) Notice: Subject to any disclaimer, the term of this patent is extended or adjusted under 35 U.S.C. 154(b) by 111 days.

(21) Appl. No.: 11/918,468

(22) PCT Filed: Apr. 10, 2006

(86) PCT No.: PCT/IB2006/051090
§ 371 (c)(1),
(2), (4) Date: Oct. 15, 2007

(87) PCT Pub. No.: WO2006/109236
PCT Pub. Date: Oct. 19, 2006

(65) Prior Publication Data
US 2009/0083369 A1    Mar. 26, 2009

Related U.S. Application Data

(63) Continuation-in-part of application No. 10/574,759, filed as application No. PCT/IB2004/003228 on Oct. 4, 2004.

(60) Provisional application No. 60/670,843, filed on Apr. 13, 2005.

(51) Int. Cl.
*G06F 15/16* (2006.01)

(52) U.S. Cl. ........ 709/246; 709/201; 709/203; 709/229; 709/236; 709/217

(58) Field of Classification Search .................. 709/201, 709/203, 217, 218, 229, 246, 236
See application file for complete search history.

(56) References Cited

U.S. PATENT DOCUMENTS

| | | | |
|---|---|---|---|
| 6,161,126 A | 12/2000 | Wies et al. | |
| 6,338,086 B1 | 1/2002 | Curtis et al. | |
| 6,360,215 B1 | 3/2002 | Judd et al. | |
| 6,507,865 B1 | 1/2003 | Hanson et al. | |
| 6,615,166 B1 | 9/2003 | Guheen et al. | |
| 7,293,253 B1 * | 11/2007 | Soukup | 717/108 |
| 2003/0105746 A1 | 6/2003 | Stickler | |
| 2003/0191608 A1 * | 10/2003 | Anderson et al. | 702/189 |

(Continued)

FOREIGN PATENT DOCUMENTS
WO    WO 2005/033827    4/2005

(Continued)

OTHER PUBLICATIONS

International Preliminary Report on Patentability Dated Apr. 13, 2006 From the International Bureau of WIPO Re.: Applicaiton No. PCT/IB04/03228.

(Continued)

*Primary Examiner* — Djenane M Bayard

(57) ABSTRACT

A method of display modification in a client server web system, comprising, intercepting, by a web intermediary, a response to a client request, sent by a server in response to the request, the response including client side active content adapted to execute at a browsing software on a client computer; replacing at least one display-related code section in said response by a wrapper section that includes code for modification of at least one display element and code for executing the original display-related code section; and executing said wrapper section as client side active content at said client to generate a display, modified from a display that would have been generated by executing the response.

29 Claims, 3 Drawing Sheets

U.S. PATENT DOCUMENTS

2005/0273858 A1* 12/2005 Zadok et al. .................. 726/24
2008/0270591 A1* 10/2008 Whittle et al. ................ 709/223
2009/0109959 A1* 4/2009 Elliott et al. .................. 370/352
2009/0138790 A1 5/2009 Larcheveque et al.

FOREIGN PATENT DOCUMENTS

WO    WO 2006/109236    10/2006

OTHER PUBLICATIONS

Official Action Dated Aug. 24, 2009 From the US Patent and Trademark Office Re.: U.S. Appl. No. 10/574,759.
Written Opinion Dated Jul. 18, 2005 From the International Searching Authority Re.: Application No. PCT/IB04/03228.
Official Action Dated Dec. 23, 2009 From the US Patent and Trademark Office Re.: U.S. Appl. No. 10/574,759.
Response Dated Apr. 22, 2010 to Official Action of Dec. 23, 2009 From the US Patent and Trademark Office Re.: U.S. Appl. No. 10/574,759.
Response Dated Jan. 19, 2011 to Official Action of Jul. 19, 2010 From the US Patent and Trademark Office Re.: U.S. Appl. No. 10/574,759.
International Search Report Dated Jul. 18, 2005 From the International Searching Authority Re.: Application No. PCT/IB04/03228.
International Search Report Dated Jun. 18, 2007 From the International Searching Authority Re.: Application No. PCT/IB06/51090.
Official Action Dated Jul. 19, 2010 From the US Patent and Trademark Office Re.: U.S. Appl. No. 10/574,759.
Written Opinion Dated Jun. 18, 2007 From the International Searching Authority Re.: Application No. PCT/IB06/51090.
Hori et al. "Annotation by Transformation for the Automatic Generation of Content Customization Metadata", Proceedings of the First International Conference on Pervasive Computing, Pervasive 2002, Zurich, Switzerland, Aug. 26-28, 2002, Lecture Notes in Computer Science, 2414: 267-281, 2002.
Hori et al. "Extensible Framework of Authoring Tools for Web Document Annotation", International Workshop of Semantic Web, p.1-16, Mar. 2003.

* cited by examiner

DYNAMIC CONTENT CONVERSION

RELATED APPLICATIONS

This application is a National Phase of PCT Patent Application No. PCT/IB2006/051090 having International Filing Date of Apr. 10, 2006, which is a continuation-in-part of a U.S. patent application Ser. No. 10/574,759 filed on Apr. 3, 2006, which is a national phase of PCT Patent application No. PCT/IB2004/003228, filed on Oct. 4, 2004, entitled "Configuration Setting" which claims the benefit of Israel Patent Application No. 158282 filed on Oct. 2, 2003. This application also claims the benefit under 35 U.S.C. 119(e) of U.S. Provisional application No. 60/670,843, filed on Apr. 13, 2005, entitled "Dynamic Content Conversion". The disclosures of all of these applications are incorporated herein by reference.

FIELD OF THE INVENTION

The present invention relates to modifying the presentation of displayed items.

BACKGROUND OF THE INVENTION

Information on the internet is disseminated to many different users. Often, the users differ in their native language. Also, the computer display abilities of one user may be different from those of another user. The information is typically extracted from a database in response to a request and sometimes generated in response to the request. The problem is that the different users will generally desire to see the information in their native language.

One possible solution is to modify the data source (e.g., a web-server) so that it supports the needs of the many different users. This may be expensive and may, in some cases, be an impossible task, as different users have different needs.

Another possibility is to change the user's computer (e.g., software thereon), for example providing a special plug-in or browser to display the data as desired. This option is typically not practical as users are adverse to installing software on their computers. The data may be unavailable if no special software is used. Also, such software may be required to work with a wide range of browser types, which may be a Herculean undertaking.

Another possibility is to provide a web-intermediary in the form of a proxy which detects and replaces strings in one language by strings in another language (thus effecting a translation). However, such a proxy does not solve the problem for strings which are generated by client side active code and cannot be detected in the material sent by the web server. In addition, it may be difficult to distinguish between strings which should be changed (e.g., phrases to be printed) and strings that are actually parts of commands and should therefore not be replaced.

SUMMARY OF THE INVENTION

An aspect of some embodiments of the invention relates to a method of changing the actual display of active content, in which the client side active content is modified by a web intermediary, in a manner transparent to a server and a client, the modification comprising adding code that when executed at the client replaces or modifies display elements generated by the active content. In an exemplary embodiment of the invention, the web-intermediary identifies a small number of functions (or methods, procedures, etc.) in the active content through which the display of display elements is funneled.

In an exemplary embodiment of the invention, no changes are required at either the client or the web server. Optionally, the web intermediary is installed as a separate software on the web server, on the client or on an intermediate computer. Optionally, the number of settings required to use the intermediary is minimal and desirably not required more than once or required by as few actors (web site administrator, user) as possible.

Optionally, the identified function(s) are then wrapped with a wrapper function that modifies their parameters, other global variables which affect them and/or return-value so that the modified display elements are displayed and the operation is generally transparent to the user. Optionally, the wrapper changes the returned value of the wrapped function(s).

In an exemplary embodiment of the invention, the wrapping comprises overloading the original functions with a new function that, as part of its operation, modifies the display element and then calls the original function. Optionally, the overloading is provided by a code that is pre-pended to the active content, optionally using an include file command. In an alternative embodiment, the calls to the original functions are replaced by calls to the replacement function. A potential advantage of overloading is that the active content need not be analyzed and not changed. This may be faster, simpler and/or prevent various types of potential error causes, for example execution of output functions by passing them as string parameters to "eval" commands.

Optionally, the web-intermediary inserts, into the active content, one or more watches on variables whose setting may change the display. One or more functions may be triggered by the changing, for example display modifying functions. Such triggered functions may be called, for example, before display changes caused by the variable setting or after.

In an exemplary embodiment of the invention, display elements that are generated by active content are treated different from display elements that are static in the active content, with respect to being modified. In one example, static display elements are modified by the web intermediary and generated elements are modified by the client.

In an exemplary embodiment of the invention, the web intermediary is one or more of a web server (incorporated with or separate from the server which provides the active content), a proxy, a reverse proxy, a transparent proxy and software executing on the client computer, possibly as part of a browser.

In an exemplary embodiment of the invention, the client computer uses a browser for example, Microsoft Internet Explorer, Netscape Navigator, Firefox, Mozzila, Opera and variants and versions of these. Such browsers can execute on, for example, desktop, laptop or smaller computer systems, such as PDAs and cellular telephones. The operating system can be, for example, Microsoft Windows, Linux, various versions of Unix and versions of such operating systems, such as Windows Mobile.

There is thus provided in accordance with an exemplary embodiment of the invention, a method of display modification in a client server web system, comprising:

intercepting, by a web intermediary, a response to a client request, sent by a server in response to the request, the response including client side active content adapted to execute at a browsing software on a client computer;

replacing at least one display-related code section in said response by a wrapper section that includes code for modification of at least one display element and code for executing the original display-related code section; and executing said wrapper section as client side active content at said client to generate a display, modified from a display that would have been generated by executing the response.

Optionally, wherein said web intermediary comprises a proxy. Optionally, said proxy comprises a transparent proxy. Alternatively or additionally, said proxy comprises a front-end proxy. Alternatively or additionally, said proxy comprises a reverse proxy.

In an exemplary embodiment of the invention, said web intermediary comprises a web server.

In an exemplary embodiment of the invention, said client side active content comprises JavaScript. Optionally, said code section comprises a document.write call. Alternatively or additionally, said code section comprises a document.writeln call.

In an exemplary embodiment of the invention, said client side active content comprises Java.

In an exemplary embodiment of the invention, said client side active content comprises Flash.

In an exemplary embodiment of the invention, said client side active content is in a separate file in said response.

In an exemplary embodiment of the invention, said client side active content is embedded in said response.

In an exemplary embodiment of the invention, said code section comprises a function call, procedure or method. Optionally, said wrapper receives at least one parameter of said function. Alternatively or additionally, said wrapper combines a plurality of parameters of said function call into a single parameter. Alternatively or additionally, said wrapper modifies a return value of said function. Alternatively or additionally, said function is a funnel function through which display by said active content is funneled.

In an exemplary embodiment of the invention, said code section comprises one or more commands.

In an exemplary embodiment of the invention, replacing comprises overloading a function definition. Optionally, said replacing comprises only making changes outside of a body of said active content.

In an exemplary embodiment of the invention, replacing comprises replacing portions of code inline. Optionally, the method comprises scanning said active content for portions of code to replace.

In an exemplary embodiment of the invention, replacing comprises providing said wrapper section as a separate file.

In an exemplary embodiment of the invention, said wrapper section is a call to a subroutine.

In an exemplary embodiment of the invention, said wrapper section is an in-line code section other than a mere subroutine call.

In an exemplary embodiment of the invention, replacing comprises adding at least one watch on at least one variable of said active content.

In an exemplary embodiment of the invention, said wrapper takes global variables into account. Optionally, said wrapper modifies a global variable.

In an exemplary embodiment of the invention, said wrapper also further modifies a global variable back to a previous value from before said modifying.

BRIEF DESCRIPTION OF THE FIGURES

Exemplary non-limiting embodiments of the invention will be described with reference to the following description of embodiments in conjunction with the figures. Identical structures, elements or parts which appear in more than one figure are preferably labeled with a same or similar number in all the figures in which they appear, in which.

DETAILED DESCRIPTION OF EXEMPLARY EMBODIMENT

Figure 1:
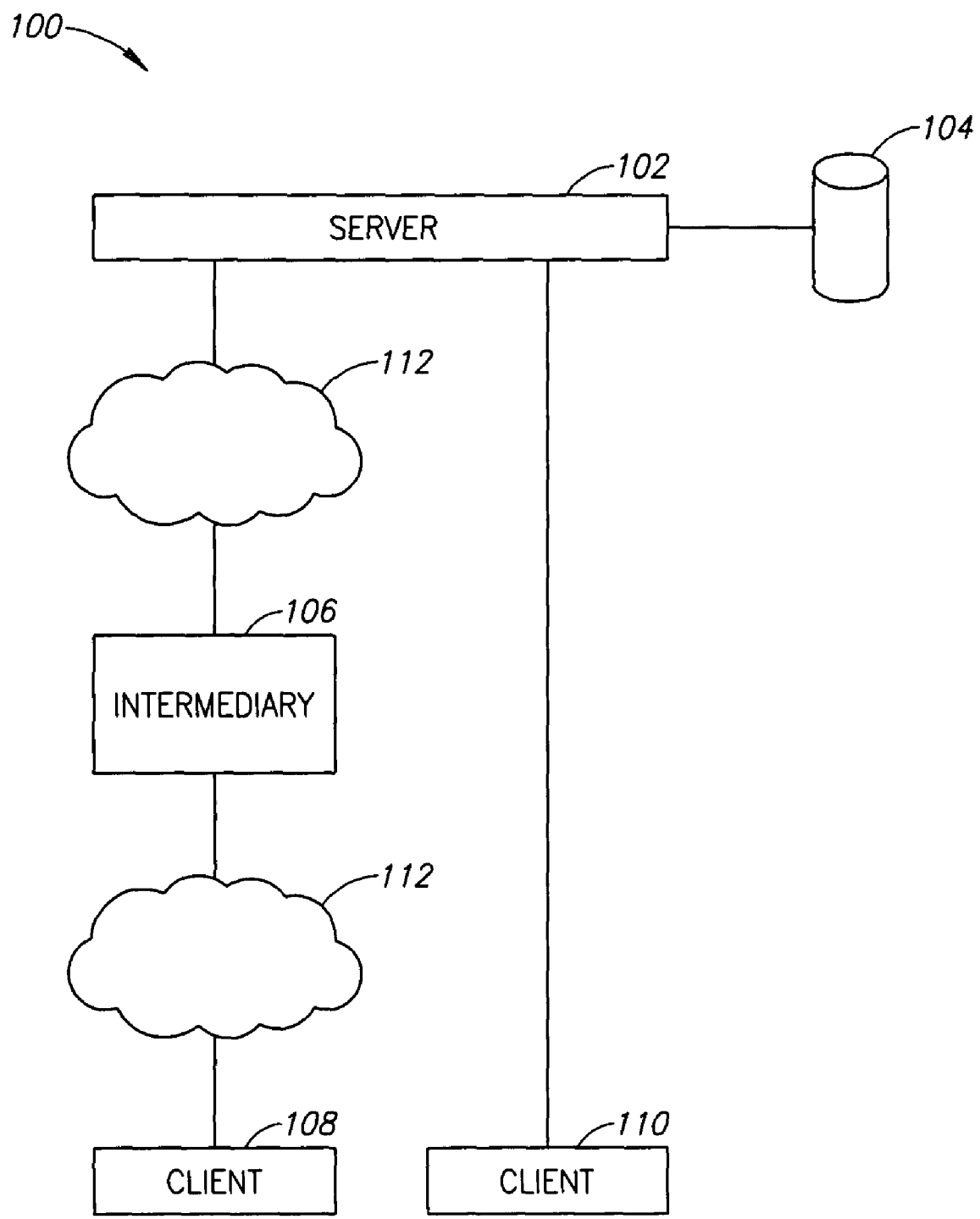
FIG. 1 is a schematic diagram of a configuration including a web-intermediary in accordance with an exemplary embodiment of the invention.

FIG. 1 is a schematic diagram of a configuration 100 including a web-intermediary 106 in accordance with an exemplary embodiment of the invention. A web server 102 sends material (e.g., data and/or active content) to one or more clients 108 and 110. The material may be stored in a database 104 and optionally modified by web server 102. In an exemplary embodiment of the invention, as described below, the material is modified by intermediary 106 before reaching client 108. Client 108, when executing active content in the material, generates a display that is modified from what would have been generated by the original material. In a particular example, intermediary 106 translates material from web server 102 into Russian, from English, with the actual substitution being performed, as the display is generated, by client 108. An Internet connection (schematically shown as clouds 112) may exist between client 108 and intermediary 106 and/or between intermediary 106 and web server 102 and/or between client 110 and web server 102 (not shown).

Figure 2:
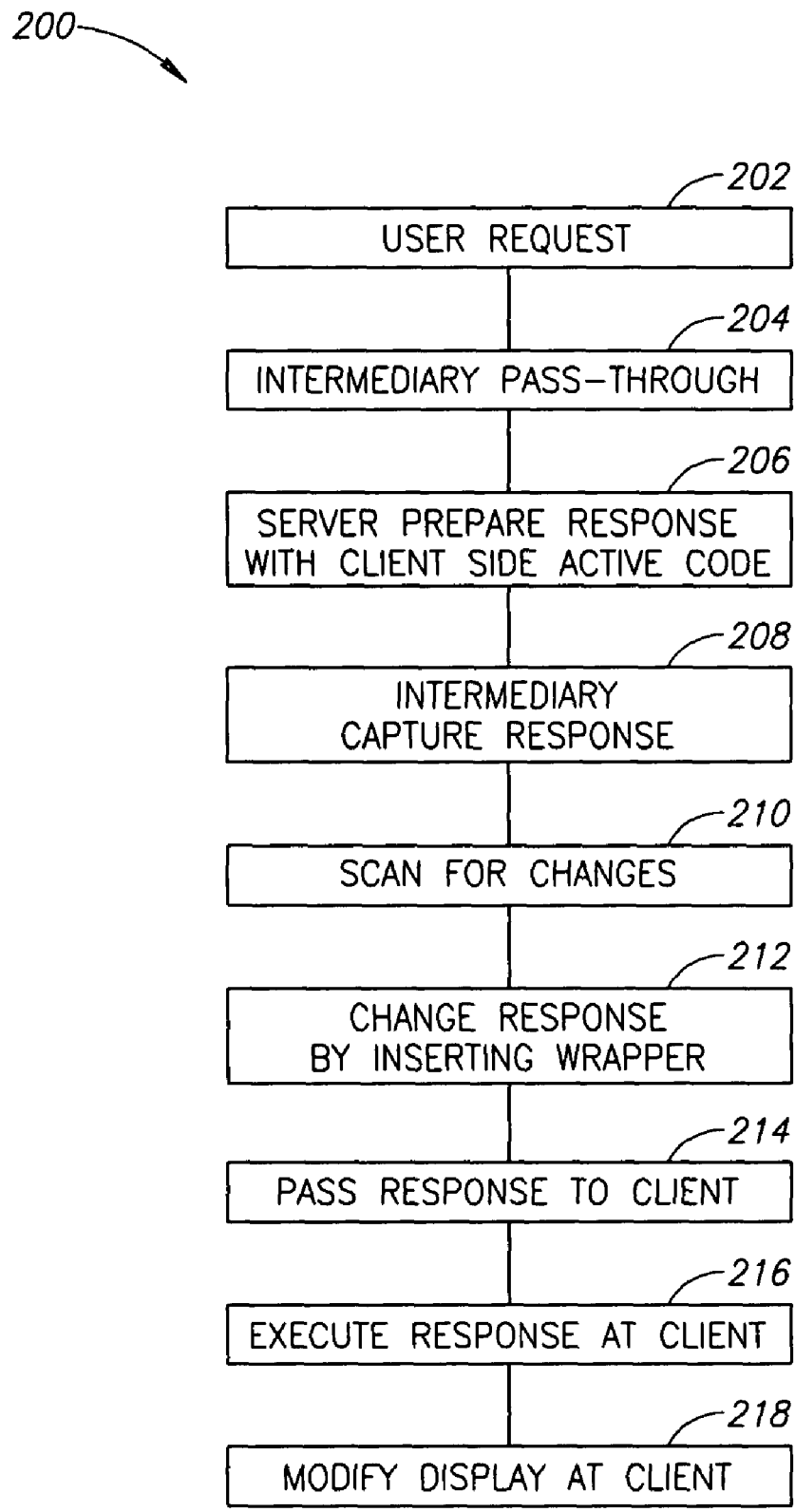
FIG. 2 is a flowchart of a method of handling a user request for active content, in accordance with an exemplary embodiment of the invention.

FIG. 2 is a flowchart 200 of a method of handling a user request for active content, in accordance with an exemplary embodiment of the invention.

At 202, client 108 sends a request for content. Depending on the system configuration, this request may be sent to web intermediary 106 (e.g., if it is a proxy, including different configurations such as reverse proxy and/or a transparent proxy) or directly to server 102.

This request can pass unchanged through intermediary 106 (204). Optionally, intermediary 106 (or a different intermediary or software at client 108) changes the request, for example, changing a desired response language, for example, in a "post" request.

At 206, server 102 prepares a response (above, "material") to the request, for example, by retrieving data from database 104 and optionally modifying the retrieved data as known in the art. This response generally includes client side active code.

At 208, the response is captured by intermediary 106. Optionally, intermediary 106 acts as a reverse proxy, so that it is the addressed recipient of the response.

At 210, intermediary 106 scans the response for changes to be made, for example based on a personalized changes table. Some possible changes include changes and/or additions to static data, code and/or functions. Active content in the material may be, for example, a separate file or embedded in an HTML (or other markup language such as XML) file.

In an exemplary embodiment of the invention, the scanning includes identifying the type of active content. Optionally, a table or coding is provided in intermediary 106 that identifies funnel functions for different active content type. Funnel functions are functions or methods or procedures (etc., depending on the type of language) through which some or all display elements that may need to be changed are funneled. Examples for JavaScript include "document.write( )" and "document.writeln( )". Exemplary active content types which are optionally supported include one or more of: JavaScript, ECMAScript, Java and/or Flash. A particular advantage of some scripting language is that functions can be overloaded. Interpreted active content, in general is typically more amenable to modification.

In Java, the object classes are optionally scanned to identify output methods which may require wrapping.

Optionally, particular content may have a pre-associated table of functions and/or variables to scan for and/or static replacements to be made. Such a table may be provided, for example, by the user or by an outside service (e.g., a service that translates WWW pages). Optionally, a user can define different desired changes for different content (WWW pages).

In an exemplary embodiment of the invention, scanning includes scanning for setting of variables or other code which may affect the display. In an exemplary embodiment of the invention, a table is maintained for each active content type indicating what patterns to scan for (e.g., and replace by wrapper functions). Optionally, a parser or analysis program is provided for each active content type, or a single programmable parser is used.

At 212, changes are optionally made in the response. Optionally, the changes are made on the fly as needs for changes are detected.

In an exemplary embodiment of the invention, overloading is performed by pre-pending an overloading section at a start (or end or other position therein) of the active content. If pre-pending and overloading is used, scanning is optionally omitted, possibly except for identification of the type of active content.

In an exemplary embodiment of the invention, the changes comprise replacing one or more funnel functions by a wrapper function. An exemplary operation of such a wrapper function is described below in FIG. 3. Alternatively or additionally to a wrapper function, the function is renamed (e.g., overloaded) to the wrapper function and a pointer to the original function stored. The wrapper function then calls the original function. This method may have the advantage of requiring fewer changes to the response.

In an exemplary embodiment of the invention, overloading is performed by adding a section to the active content with the overloading function. Optionally, the active content is modified to include an "include" command. A potential advantage of using an include section is that the included file can be separately transmitted and optionally cached at client 108.

In an exemplary embodiment of the invention, content filters which might block the content based on static data therein are overcome by encoding the data and then using a wrapper function to decode the data before display. In the case of code, such as commands and/or expressions, an encoded string form is passed to the decoding function (such as unescape( ) in JavaScript), and then to an evaluation function (such as eval( ) in JavaScript).

Optionally, different funnel functions are replaced by different wrappers.

In an exemplary embodiment of the invention, the changes include replacing a setting of a (global) variable (e.g., that affects display or that modifies a display element) by a wrapper function. This wrapper function optionally has the same side effects (setting of variable) as the original setting. In an exemplary embodiment of the invention, a global variable is changed in order to fool a display function. One example of a variable which affects the operation of other functions is a global variable that indicates a direction of text writing on a screen. Prior to writing a translated text with an opposite text direction, the variable may be changed and then changed back after the call.

Optionally, the changes include the insertion of an initialization function or variable settings (or an include section, as described above). One example where this may be useful is setting of watches on variables and inclusion of functions to be called upon setting of such variables.

Typically, the main four fields used for display settings are:
DOM.object.innerHTML=new_content;
DOM.object.outerHTML=new_content;
DOM.object.innerText=new_content;
DOM.object.outerText=new_content;
The field (innerHTML/outerHTML/innerText/outerText) is concatenated to a reference to any DOM element of the page (DOM is the Document Object Model of the HTML page; Using DOM, one can reference any element of the page, in different ways, such as "document.body" or "document.forms[0].field2").

Under some browsers (such as Netscape Navigator), there is a function called "watch( )", which can be used to "watch" a variable, so anytime this variable is changed, a callback that the programmer passed its reference to the watch( ) function, is called.

Optionally, the modification includes a watchdog function that modifies new active content that is automatically generated by the active content and changes this content if necessary. Optionally, such new content is sent to intermediary 106 for modification. Optionally, an "eval" function is wrapped to capture newly generated code, optionally including variable settings, that is executed.

The changes optionally include changing static objects (e.g., strings), for example by translation.

At 214, the modified response is passed to client 108, where it is executed (216) and the display is modified (218) according to the wrapper functions.

In a typical browser operation, the response is parsed into a tree when received and identified display elements displayed. In parallel (or before or after) JavaScript sections are executed. These sections include the wrapped functions, the effect of the wrapped functions is generally to modify the tree which thus modifies the display.

Figure 3:
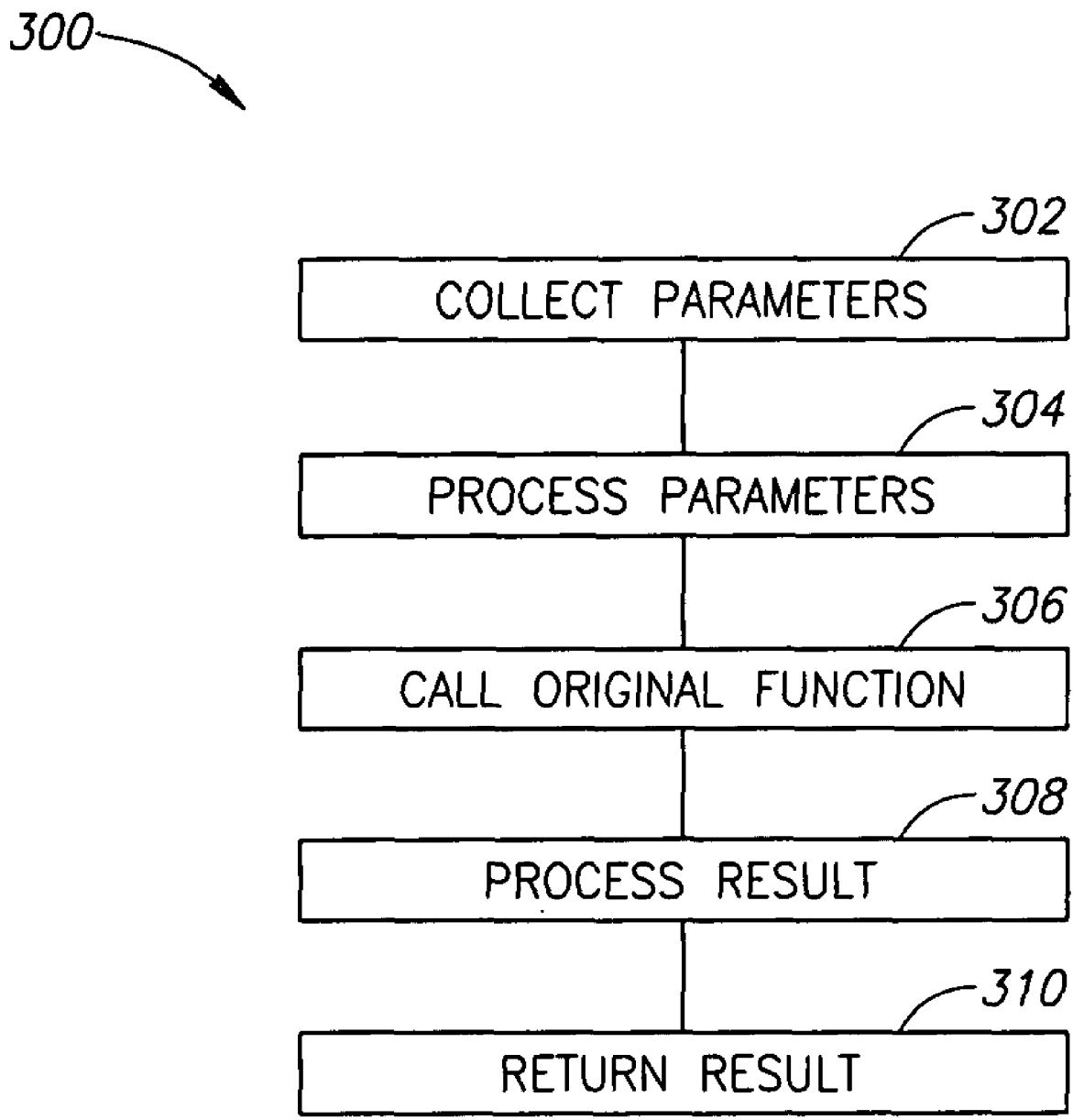
FIG. 3 is a flowchart of a method of operation of a function wrapper, in accordance with an exemplary embodiment of the invention.

FIG. 3 is a flowchart 300 of a method of operation of a function wrapper, in accordance with an exemplary embodiment of the invention.

At 302, the parameters used to call the funnel (original) function are optionally collected. Optionally, when generating the wrapper function, the function is generated to include explicit reference to (global) variables set by the active content. For example, a global variable, such as LTR (direction of text) may be modified within the wrapper. Optionally, the generation of the wrapper takes into account the specifics of the active content, for example a list of global variables to be taken into account may be associated with particular active content.

In an exemplary embodiment of the invention, the parameters are also pre-processed. One example of pre-processing is to concatenate the parameters. This can have the advantage that any split text is not combined into a single word which will later be identified as needing translation. This can have another advantage that it may be simpler (in some languages) to concatenate parameters and send as a single parameter to the original function than to send an array of parameters to the original function, especially in functions with a variable number of parameters ("varargs").

At 304, the parameters are processed, for example, a string for printing is translated and replaced by a translation string.

Another example of processing is changing a direction of text writing direction. In an exemplary embodiment of the invention, the translation is in accordance with a translation table. The wrapper function optionally includes a search command to search the table. Alternatively, other methods, such as database-lookup (e.g., in a remote site or stored locally) or direct coding for replacement, may be used.

In an exemplary embodiment of the invention, the wrapper includes code for detecting the source language or text writing direction, for example using methods known in the art. Alternatively or additionally, a tag or meta-tag in the material is used to identify the need for translation.

At 306, the original funnel function is called with the processed parameters. Alternatively, a replacement display function is called.

At 308, the result of the funnel function is optionally processed. One example of such a modification is returning the number of characters that would have been printed by the original string, rather than the actual number of printed characters.

At 310, the processed result is returned.

Following is an example of a wrapper function.

```
*******start of wrapper*****
document_write_original = document.write;
function document_write_replace(str) {
    if (str == "File")
        return ("Directory");
    return (str);
}
document.write = function document_write_wrapper(str) {
    return (document_write_original(document_write_replace(str)));
}
******end of wrapper******
******start of original active content******
.......
document.write("File");
.......
******end of original active content******
```

In this particular example, the original active content is not modified except by pre-pending of the overloading wrapper function.

The above described method may be used as part of a conversion system such as described in PCT publication WO 98/44424 and PCT application PCT/IB2004/003228, the disclosures of which are incorporated herein by reference.

In http://www.ietf.org/rfc/rfc2616.txt, the disclosure of which is incorporated herein by reference, there is provided a definition of an HTTP protocol and proxy.

The following documents, the disclosures of which are incorporated herein by reference, include documentation regarding methods and properties discussed herein:

http://msdn.microsoft.com/workshop/author/dhtml/reference/methods/write.asp http://msdn.microsoft.com/workshop/author/dhtml/reference/properties/innerhtml.asp http://msdn.microsoft.com/library/en-us/script56/html/js56jsmthunescape.asp http://msdn.microsoft.com/library/en-us/script56/html/js56jslrfJScriptMethodsTOC.asp The present invention has been described using non-limiting detailed descriptions of embodiments thereof that are provided by way of example and are not intended to limit the scope of the invention. It should be understood that features described with respect to one embodiment may be used with other embodiments and that not all embodiments of the invention have all of the features shown in a particular figure or described with respect to one of the embodiments. It is noted that some of the above described embodiments may describe the best mode contemplated by the inventor and therefore include structure, acts or details of structures and acts that may not be essential to the invention and which are described as examples.

While the above description has focused on methods, it is meant to also encompass apparatus for carrying out the invention. The apparatus may be a system comprising of hardware and software. The apparatus may be a system, such as, programmed computers or a network appliance. The apparatus may include various computer readable media having suitable software thereon, for example, diskettes and computer and/or flash RAM.

Structure and acts described herein are replaceable by equivalents, which perform the same function, even if the structure or acts are different, as known in the art. Therefore, only the elements and limitations as used in the claims limit the scope of the invention. When used in the following claims, the terms "comprise", "include", "have" and their conjugates mean "including but not limited to".

The invention claimed is:

1. A method of display modification in a client server web system, comprising: intercepting, by a web intermediary, a response to a client request, sent over a computer network, by a server in response to the request, the response including client side active content adapted to execute at a browsing software on a client computer; changing said response to include a wrapper section with a modification code for modification of at least one display element code of the client side active content; and sending the wrapper section and client side active content, to the client computer from said web intermediary over said computer network; wherein the modification code is set to be executed with the client side active content by the client computer so as to generate a display, modified from a display that would have been generated by executing the response with the client side active content and without the modification code;

wherein said changing comprises storing a function of said client side active content in a temporary record and overriding said function in said client side active content with a new function;

wherein said new function calls said temporary record when being executed on said client computer to perform said function.

2. A method according to claim 1, wherein said web intermediary comprises a proxy.

3. A method according to claim 2, wherein said proxy comprises a transparent proxy.

4. A method according to claim 2, wherein said proxy comprises a front-end proxy.

5. A method according to claim 2, wherein said proxy comprises a reverse proxy.

6. A method according to claim 1, wherein said web intermediary comprises a web server.

7. A method according to claim 1, wherein said intercepted client side active content comprises JavaScript.

8. A method according to claim 7, wherein said code section comprises a document.write or writeln call.

9. A method according to claim 1, wherein said intercepted client side active content comprises Java.

10. A method according to claim 1, wherein said intercepted client side active content comprises Flash.

11. A method according to claim 1, wherein said intercepted client side active content is in a separate file in said response.

12. A method according to claim 1, wherein said intercepted client side active content is embedded in said response.

13. A method according to claim 1, wherein said code section comprises a function, procedure or method.

14. A method according to claim 13, wherein said wrapper receives at least one parameter of said function, procedure or method.

15. A method according to claim 13, wherein said wrapper modifies a return value of said function, procedure or method.

16. A method according to claim 13, wherein said function, procedure or method is a funnel function through which said modified display, by said intercepted active content, is funneled.

17. A method according to claim 1, wherein said code section comprises one or more commands.

18. A method according to claim 1, wherein replacing comprises overloading a function definition.

19. A method according to claim 1, wherein replacing comprises replacing portions of code inline.

20. A method according to claim 1, wherein replacing comprises providing said wrapper section as a separate file.

21. A method according to claim 1, wherein said wrapper section is a call to a subroutine.

22. A method according to claim 1, wherein said wrapper section is an in-line code section other than a mere subroutine call.

23. A method according to claim 1, wherein replacing comprises adding at least one watch on at least one variable of said intercepted active content.

24. A method according to claim 1, wherein said wrapper takes global variables into account by modifying at least one global variable.

25. A method according to claim 24, wherein said wrapper also further modifies a global variable back to a previous value from before said modifying.

26. A method according to claim 1, wherein the client side active content is a script.

27. A method according to claim 1, wherein the client side active content is interpreted by the browsing software on a client computer.

28. A method according to claim 1, wherein client side active content is a textual content.

29. A method of display modification in a client server web system, comprising: intercepting, by a web intermediary, a response to a client request, sent over a computer network, by a server in response to the request, the response including client side active textual content adapted to execute at a browsing software on a client computer; changing said response to include a wrapper section with a modification code for modification of at least one text display element code of the client side active textual content; and sending the wrapper section and client side active textual content, to the client computer from said web intermediary over said computer network; wherein the modification code is set to be executed with the client side active textual content by the client computer so as to generate a textual display, modified from a textual display that would have been generated by executing the response with the client side active textual content and without the modification code;

wherein said changing comprises storing a function of said client side active content in a temporary record and overriding said function in said client side active content with a new function;

wherein said new function calls said temporary record when being executed on said client computer to perform said function.

\* \* \* \* \*